(12) United States Patent
Lee et al.

(10) Patent No.: US 8,171,092 B2
(45) Date of Patent: May 1, 2012

(54) METHOD FOR DELIVERING CPM MESSAGE AND SERVER THEREOF

(75) Inventors: Hyeon-Soo Lee, Gyeonggi-Do (KR); Christophe Le Thierry D'Ennequin, Paris (FR); Kang-Suk Huh, Gyeonggi-Do (KR); Dong-Young Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 284 days.

(21) Appl. No.: 12/689,880

(22) Filed: Jan. 19, 2010

(65) Prior Publication Data
US 2010/0185741 A1    Jul. 22, 2010

Related U.S. Application Data

(60) Provisional application No. 61/145,731, filed on Jan. 19, 2009, provisional application No. 61/242,339, filed on Sep. 14, 2009, provisional application No. 61/244,009, filed on Sep. 18, 2009, provisional application No. 61/252,149, filed on Oct. 15, 2009, provisional application No. 61/253,488, filed on Oct. 20, 2009, provisional application No. 61/253,827, filed on Oct. 21, 2009, provisional application No. 61/264,251, filed on Nov. 25, 2009.

(30) Foreign Application Priority Data

Jan. 13, 2010    (KR) ................ 10-2010-0002951

(51) Int. Cl.
*G06F 15/16*    (2006.01)
(52) U.S. Cl. .............. 709/206; 709/229; 726/3
(58) Field of Classification Search .......... 709/206, 709/217, 229; 726/3
See application file for complete search history.

(56) References Cited

U.S. PATENT DOCUMENTS

| | | | | |
|---|---|---|---|---|
| 5,513,339 A * | 4/1996 | Agrawal et al. | ................ | 703/15 |
| 8,050,269 B2 * | 11/2011 | Kim | ............................ | 370/392 |
| 2008/0075115 A1 * | 3/2008 | Brendes et al. | ............... | 370/467 |
| 2008/0114881 A1 | 5/2008 | Lee et al. | | |
| 2008/0123686 A1 * | 5/2008 | Lee et al. | ...................... | 370/466 |
| 2009/0052455 A1 * | 2/2009 | Kim | ............................ | 370/392 |
| 2009/0213841 A1 * | 8/2009 | Masson | ........................ | 370/352 |
| 2010/0318624 A1 * | 12/2010 | Pattan et al. | ................. | 709/207 |
| 2011/0208830 A1 * | 8/2011 | Haruna et al. | ................ | 709/217 |

FOREIGN PATENT DOCUMENTS

| | | |
|---|---|---|
| KR | 10-2008-0043103 A | 5/2008 |
| KR | 10-2008-0043134 A | 5/2008 |
| KR | 10-2008-0043264 A | 5/2008 |

* cited by examiner

*Primary Examiner* — Ario Etienne
*Assistant Examiner* — El Hadji Sall
(74) *Attorney, Agent, or Firm* — Birch, Stewart, Kolasch & Birch, LLP

(57) ABSTRACT

Disclosed is a method for delivering a message in a converged IP messaging (CPM) server. The message delivery method may include determining whether to reject a CPM message based on the access policy if the CPM message is received; checking a user preference of a target terminal to determine processing of the CPM message if it is determined that the CPM message is not rejected; determining whether to reject, defer or store the CPM message based on the user preference if the target terminal is not registered or in an unreceivable state; storing the CPM message in a queue if it is determined that a transmission of the CPM message is deferred; determining whether to discard or store the CPM message based on the user preference if a timer for the CPM message is expired; requesting to store the message to a message storage server if it is determined to be stored; receiving a response message including information on the stored message from the message storage server; and transmitting a message including the information on the store message to the terminal.

13 Claims, 10 Drawing Sheets

METHOD FOR DELIVERING CPM MESSAGE AND SERVER THEREOF

CROSS-REFERENCE TO RELATED APPLICATION

The present application is related to and claims the benefit of U.S. Provisional Applications No. 61/145,731 filed on Jan. 19, 2009, No. 61/242,339 filed on Sep. 14, 2009, No. 61/244,009 filed on Sep. 18, 2009, No. 61/252,149 filed on Oct. 15, 2009 and No. 61/253,488 filed on Oct. 20, 2009, No. 61/253,827 filed on Oct. 21, 2009, No. 61/264,251 filed on Nov. 25, 2009 and the benefit of earlier filing date and right of priority to Korean Applications No. 10-2010-0002951 filed on Jan. 13, 2010, the entire contents of which being incorporated herein by reference.

TECHNICAL FIELD

The present invention relates to a converged IP messaging (CPM) service.

BACKGROUND ART

Nowadays, there are various services for transmitting and/or receiving a message through portable devices, for instance, SMS, MMS, email service, and the like.

In a system for providing SMS and MMS services which are commonly used in this manner, there is no server for storing a user's message. Instead, if the user's terminal becomes in a situation that cannot receive a message such as power-off of the terminal, or the like, then a server in charge of transmitting the message temporarily stores the message. Then, if the user's terminal comes back to a situation that can receive a message, the temporarily stored message is transmitted. However, the server in charge of transmitting the message is not originally intended to store messages, and thus it stores the message only for a predetermined period of time and then deletes the message when the storage capacity becomes full. When the terminal requests the message to the server subsequent to the deletion, the server transmits an error message to the terminal.

On the other hand, in recent years, there have been attempts to integrate the foregoing various message services. One of those attempts is a Converged IP messaging (CPM) service.

The CPM service is a service in which the user can send and receive a CPM message in the environments of an IP multimedia subsystem. The CPM supports the environments of a pager mode message and a session mode message. Furthermore, the CPM service supports not only discrete media but also continuous media.

FIG. 1 is a block diagram illustrating the configuration of a network and a terminal for CPM services.

Referring to FIG. 1, there are illustrated a terminal 10, a SIP/IP network 50, a message storage server 60, an interworking server 70, and a CPM server 80.

First, the terminal 10 may include a message storage client 11 and a CPM client 12. The message storage client 11 stores transmitted and received messages, and synchronizes the stored messages with the message storage server 60.

The SIP/IP network 50 may be a network on the basis of IMS.

The message storage server 60 receives a message from the CPM server 80, and performs a role of storing transmitted and received messages and a conversation history with the media based on the users preference. Furthermore, the message storage server 60 may share data through synchronization with the terminal 10. In other words, the message storage server 60 receives and stores a message stored in the terminal 10, and transmits the message stored in the message storage server 60 to the terminal 10.

The message storage server 60 uses IMAP protocol for the synchronization. Accordingly, the message storage server 60 performs a role of an IMAP server, and the terminal 10 is operated as an IMAP client.

The interworking server 70 may include an interworking function unit 71 and an interworking selection function unit 72. The interworking function unit 71 performs a role of converting a CPM message into SMS, MMS, and the like, or converting SMS, MMS, and the like into a CPM message. The interworking selection function unit 72 performs a role of determining whether or not the conversion is performed.

The CPM server 80 may include a CPM participating function (PF) server 81 and a CPM controlling function (CF) server 82. The CPM PF server 81 transmits a message to the message storage server 60. Also, the CPM PF server 81 transmits and/or receives messages to and/or from the CPM client 12 of the terminal 10.

FIG. 2 is an exemplary view illustrating a process of transmitting and/or receiving CPM messages.

Referring to FIG. 2, there are illustrated a terminal A1 10A of a user A, terminals B1 and B2 10B of a user B, a home network of the user A, a home network of the user B, and a message storage server 60. The home network of the user A may include a SIP/IP network 50A and a CPM PF server 81A. The home network of the user B may include a SIP/IP network 50B and a CPM PF server 81B.

First, according to a request of the user A, the terminal A1 10A transmits a message to the CPM PF server 81A through the SIP/IP network 50A (S01, S02). The CPM PF server 81A transmits the message to the CPM PF server 81B through the SIP/IP network 50A within a home network of the user A and the SIP/IP network 50B in a home network of the user B (S03, S04, S05).

When receiving the message, the CPM PF server 81B transmits it to a terminal B1 10B of the user B though the SIP/IP network 50B (S06, S07).

Also, when receiving the message, the CPM PF server 81B transmits it to a terminal B2 10B of the user B though the SIP/IP network 50B (S08, S09).

The terminals B1 10B and B2 10B of the user B transmit OK messages respectively to the CPM PF server 81B through the SIP/IP network 50B within a home network of the user B (S10, S11).

When receiving the OK message, the CPM PF server 81B transmits it to the CPM PF server 81A of the user A through the SIP/IP network 50B within the home network of the user B and the SIP/IP network 50A within the home network of the user A (S12-S15).

When receiving the OK message, the CPM PF server 81A within the home network of the user A delivers the OK message to the terminal A1 10A that has transmitted the message (S16).

In the above, there has been described a process of delivering a message. Hereinafter, an example will be illustrated in which the transmitted and received message is stored in the message storage server 60.

FIG. 3 is a flow chart illustrating the operation of entities illustrated in FIG. 1.

The processes S21-S25 illustrated in FIG. 3 are similar to the processes S01-S05 illustrated in FIG. 2, and thus the content of FIG. 1 will be used for the description.

When receiving a message from the terminal A1, the CPM PF server 81B within a home network of the user B checks the status of the terminal B1 10B, and determines whether or not the transmission of the message will be deferred if the message cannot be transmitted by the terminal B1 10B (826).

When the message is deferred, the CPM PF server 81B inserts an ID of the message into a notification message indicating that the transmission of the message is deferred and then transmits it to the terminal B1 10B (S27). The terminal B1 10B stores the notification message therein (S28).

In response to the message, on the other hand, the CPM PF server 81B transmits an OK message to the CPM PF server 81A of the user A through the SIP/IP network 50B within a home network of the user B and the SIP/IP network 50A within a home network of the user A (S29-S31). The CPM PF server 81A of the user A transmits an OK message to the terminal A1 10A through the SIP/IP network 50A (S32).

On the other hand, the CPM PF server 81 B determines whether or not the message will be stored in the message storage server 60 when a timer for the deferred message is expired (S33). When it is determined to be stored, the CPM PF server 81B delivers the message to the message storage server 60 to store therein (S35, S36), and receives an OK message from the message storage server (S37). Subsequently, the CPM PF server 81B deletes the message that has been stored therein itself (S38).

On the other hand, the terminal B1 10B requests the transmission of the message to the CPM PF server 81B using an ID of the message when it becomes a state capable of receiving a message (S39).

However, because the message has been deleted in its own storage, the CPM PF server 81 B cannot process the requested transmission of the message, and as a result, it will transmit a failure message to the terminal B1 10B (S40).

In addition, there is no method for checking whether or not the message is stored within the message storage server 60, and as a result, it has a problem that the terminal B1 10B cannot acquire the message.

DISCLOSURE OF THE INVENTION

Therefore, it is an object of the present invention to solve the foregoing problems.

In other words, when a message is not transmitted but deferred, an object of the present invention is to allow a terminal to correctly receive the deferred message. Another object of the present invention is to reduce the failure of transmitting and receiving messages, thereby preventing unnecessary radio resources from being wasted.

In order to accomplish the foregoing object, the present invention provides a method for delivering a message in a converged IP messaging (CPM) server. The message delivery method may include determining whether to reject a CPM message based on an access policy if the CPM message is received; checking a user preference of a target terminal to determine a processing of the CPM message if the CPM message is not rejected; determining whether to reject, defer or store the CPM message based on the user preference if the target terminal is not registered or in an unreceivable state; storing the CPM message in a queue if it is determined that a transmission of the CPM message is deferred; determining whether to discard or store the CPM message based on the user preference if a timer for the CPM message is expired; requesting to store the CPM message to a message storage server if it is determined to be stored; receiving a response message including information on the stored message from the message storage server; and transmitting a message including the information on the stored message.

On the other hand, in order to accomplish the foregoing object, the present invention provides a converged IP messaging (CPM) server. The CPM server may include a processor for determining whether to reject a CPM message based on the access policy if the CPM message is received, checking a user preference of a target terminal to determine a processing of the CPM message if it is determined that the CPM message is not rejected, determining whether to reject, defer or store the CPM message based on the user preference if the target terminal is not registered or in an unreceivable state, storing the CPM message in a queue if it is determined that a transmission of the CPM message is deferred, and determining whether to discard or store the CPM message based on the user preference if a timer for the CPM message is expired. Furthermore, the CPM server may include a transceiver for requesting to store the message to a message storage server if it is determined to be stored by the processor, receiving a response message including information on the stored message from the message storage server and transmitting a message including the information on the stored message to the target terminal.

The user preference may include a first user preference for determining the processing of the message and a second user preference related to the storing of the message.

The user preference may include first information on processing directions for a situation where the target terminal is not registered or in an unreceivable state; and second information on processing directions for a situation where the target terminal is registered or in a receivable state.

The first information may include at least one of rejecting, deferring, storing and interworking.

The information on the message may include identification information on the CPM message.

The information on the message may allow to discern the CPM message from other messages within the message storage server. The information on the message may be a unique identifier (UID) for the message.

The notification message may further include information on the message storage server. The notification message may be a SIP-based message.

The CPM server may be located within a home network of the target terminal.

When a message is not transmitted but deferred, the present invention may allow the terminal to correctly receive the deferred message afterwards. Furthermore, the present invention may reduce the failure of transmitting and receiving messages, thereby preventing unnecessary radio resources from being wasted.

MODES FOR CARRYING OUT THE PREFERRED EMBODIMENTS

Figure 1:
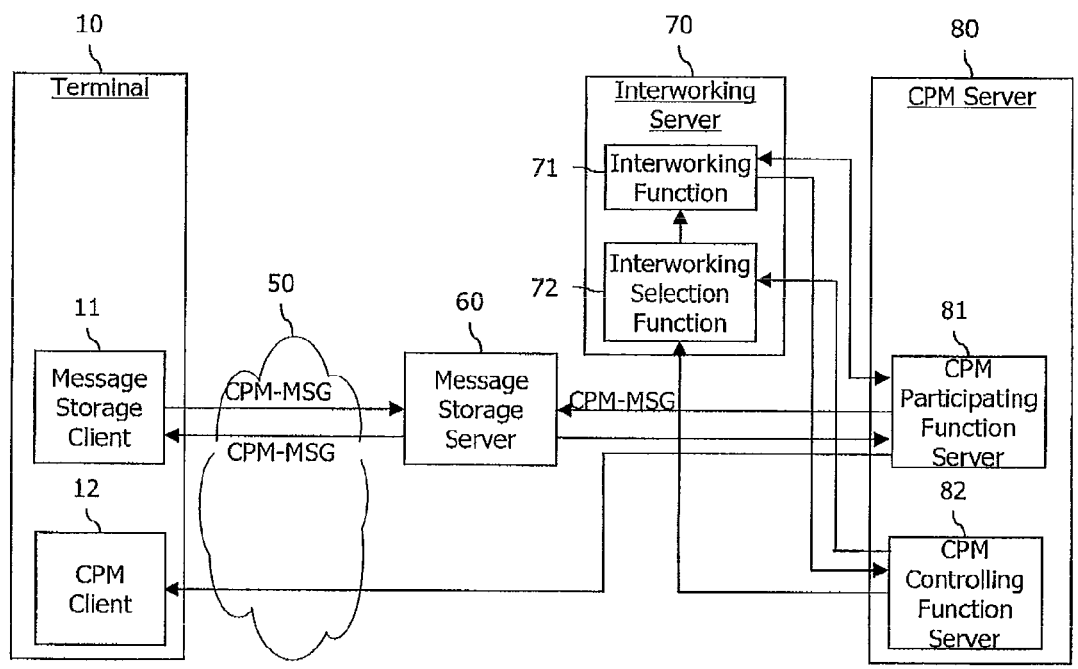
FIG. 1 is a block diagram illustrating the configuration of a network and a terminal for CPM services.
Figure 2:
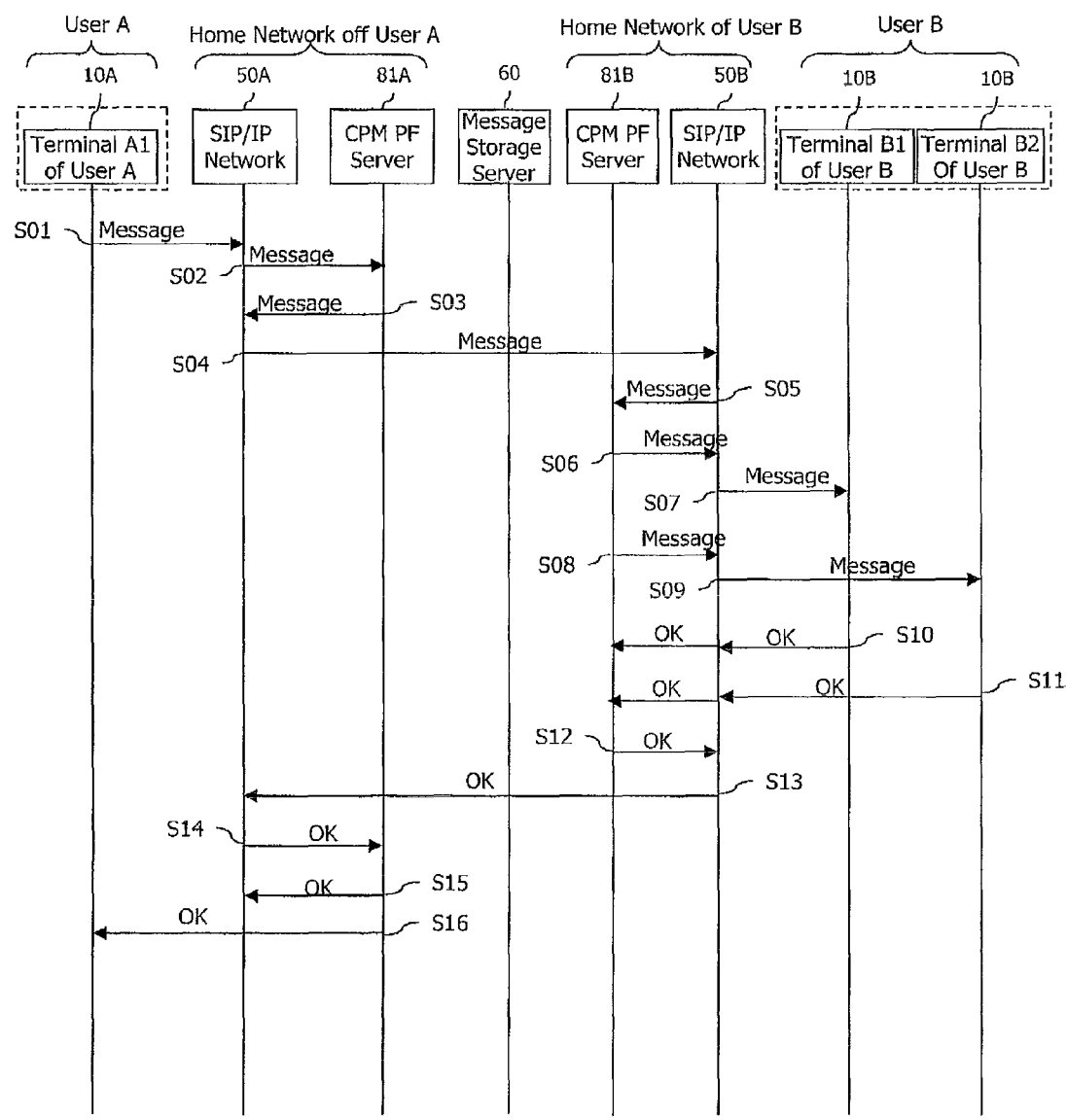
FIG. 2 is an exemplary view illustrating a process of transmitting and/or receiving CPM messages.
Figure 3:
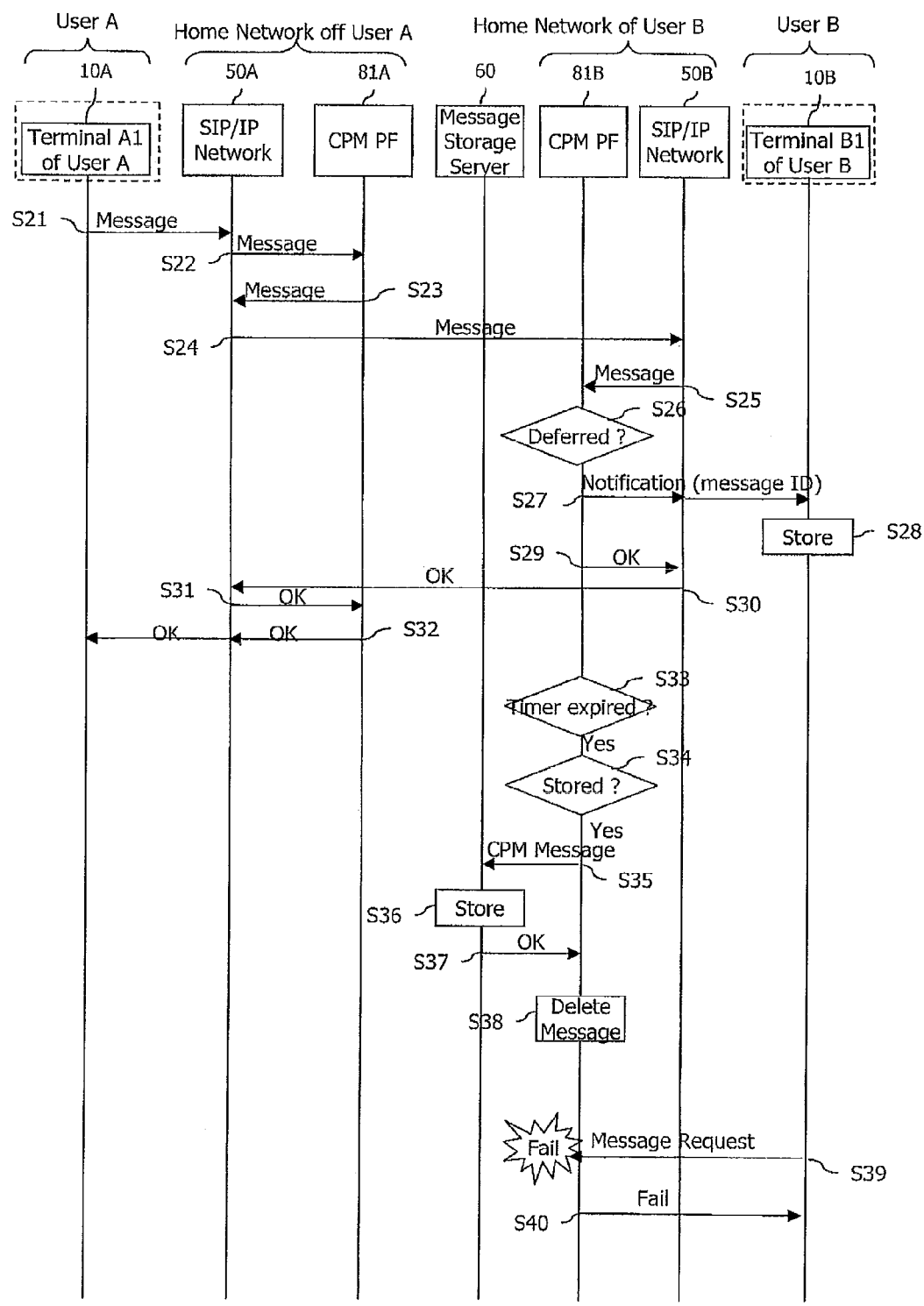
FIG. 3 is a flow chart illustrating the operation of entities illustrated in FIG. 1.

The present invention may be applicable to a CPM message service. However, the present invention may be also applicable to all kinds of message services to which the technical spirit of the present invention is applicable, for instance, SMS, EMS, MMS, and the like.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

Definition of Terms

Converged IP Messaging (CPM): Converged IP messaging service

CPM Client: A client software program capable of transmitting and/or receiving CPM messages as illustrated in FIG. 1.

Message Storage Client: It stores transmitted and received messages, and performs synchronization with a message storage server as illustrated in FIG. 1.

CPM Participating Function (PF) Server: It performs a role of delivering a message to the CPM client as illustrated in FIG. 1. Furthermore, it performs a role of delivering a message to the message storage server 60 as illustrated in FIG. 1. In addition, it performs a role of receiving a converted message from the interworking function unit 71 as illustrated in FIG. 1.

Message Storage Server: It stores a message received from a CPM PF server, and performs synchronization with a message storage client 11 as illustrated in FIG. 1.

Interworking Selection Function: It performs a role of determining whether or not an interworking function is performed.

Interworking Function: It performs a role of converting a CPM message into SMS, MMS, and the like, or converting SMS, MMS, and the like to a CPM message.

Internet Messaging Access Protocol (IMAP): A communication protocol for reading a mail from an Internet mail server.

CPM Large Message Mode: A mode for transmitting a large-sized CPM message using Message Session Relay Protocol (MSRP).

CPM Pager Mode: A mode for transmitting and receiving a limited sized CPM message without setting a MSRP session.

CPM Session: An interaction made between two or more participants for exchanging CPM messages/continuous media.

Hereinafter, a terminal is illustrated as illustrated in FIGS. 4 through 9, but the terminal may be also called UE (User Equipment), ME (Mobile Equipment), and MS (Mobile Station). Furthermore, the terminal may be portable equipment such as a portable phone, a PDA, a smart phone, and a notebook, or non-portable equipment such as a PC, and a vehicle-loaded device.

Figure 4:
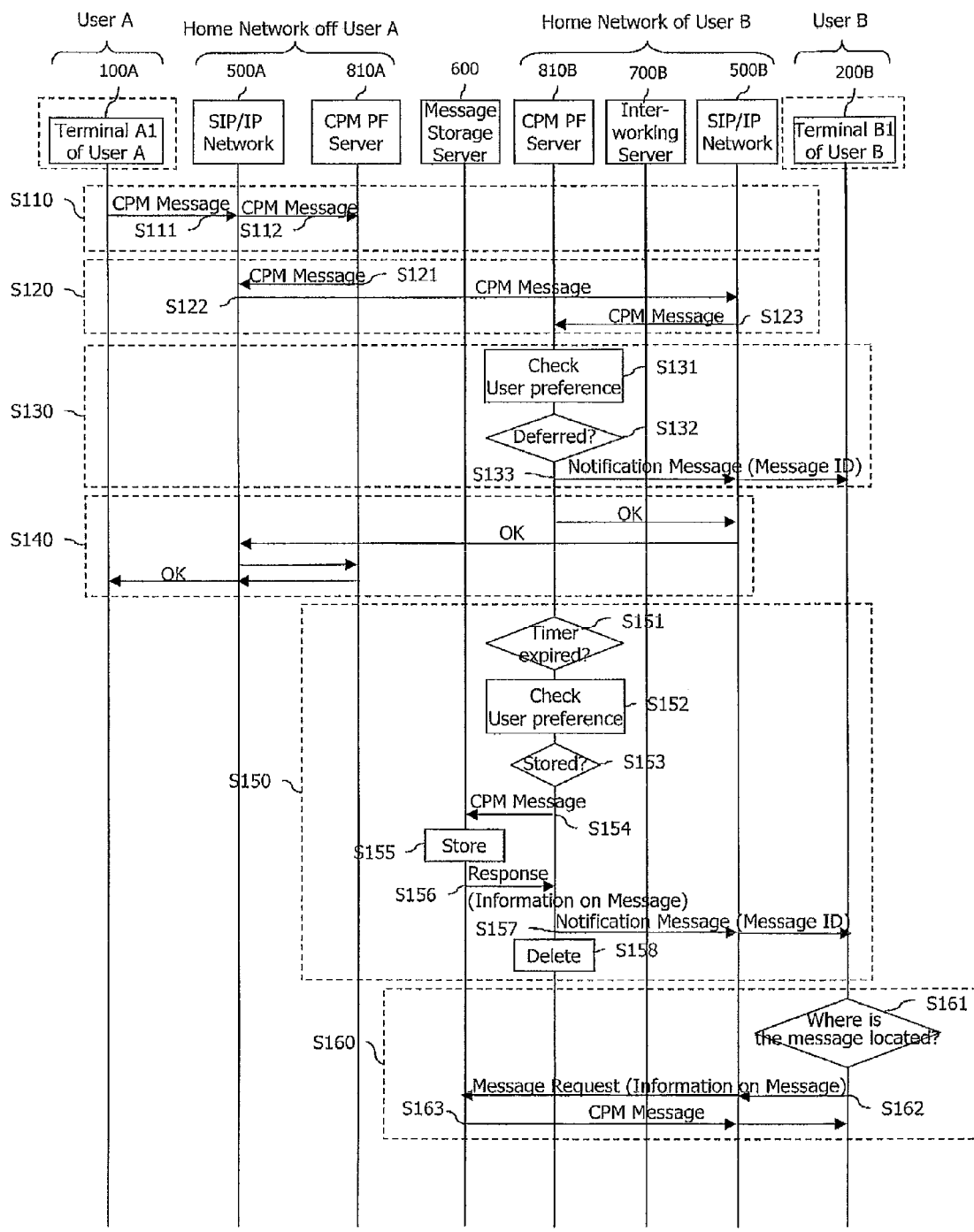
FIG. 4 is a flow chart exemplarily illustrating a first embodiment of the present invention.

FIG. 4 is a flow chart exemplarily illustrating a first embodiment of the present invention.

In FIG. 4, there are illustrated a terminal A1 100A of a user A, a terminal B1 100B of a user B, a home network of the user A, a home network of the user B, and a message storage server 600. The home network of the user A may include a SIP/IP network 500A and a CPM PF server 810A. The home network of the user B may include a SIP/IP network 500B and a CPM PF server 810B.

In FIG. 4, there are illustrated procedures (S110) of transmitting a CPM message by the terminal A1 100A of the user A, procedures (S120) of delivering a CPM message to a CPM PF server within a home network of the user B, a procedure (S130) of checking user preference and processing when there is no receivable terminal, procedures (S140) of transmitting a response message to the terminal A1 100A, procedures (S150) of processing a deferred message, and procedures (S160) of acquiring the message by the terminal B1 100B.

1) First, procedures (S110) of transmitting a CPM message by the terminal A1 100A of the user A will be described below.

The terminal A1 (100A) transmits a CPM message to the CPM PF server 810A through the SIP/IP network 500A according to a request of the user A (S111, S112).

At this time, in case where the size of the CPM message is for example up to 1300 bytes, the CPM message is encapsulated within a SIP MESSAGE to be transmitted. A CPM feature tag indicating a CPM message is included within the CPM message.

On the other hand, though not shown in the drawing, in case where the message transmitted by the terminal A1 100A is a different type of message (for instance, SMS, MMS, or email) which is not a CPM message, the different type of message passes through an interworking function unit of the interworking server to be converted into a CPM message. If the converted CPM message does not exceed 1300 bytes, then the interworking function unit transmits the converted CPM message based on a CPM Pager Mode. If exceeding 1300 bytes, the interworking function unit transmits the converted CPM message based on a CPM Large Message Mode.

2) Next, procedures (S120) of delivering a CPM message to a CPM PF server within a home network of the user B will be described below.

If the CPM PF server 810A within a home network of the user A receives the CPM message, then the CPM message is delivered to the CPM PF server 810B within a home network of the user B through the SIP/IP network 500A within the home network of the user A and the SIP/IP network 500B within the home network of the user B (S121-S123).

3) Next, a procedure (S130) of checking user preference will be described below.

If the CPM PF server 810B within the home network of the user B receives the CPM message, then a user preference (or settings) of the user B is checked (S131). It will be described in detail below.

(a) First, the CPM PF server 810B within the home network of the user B determines whether to reject the CPM message. In other words, the CPM PF server 810B checks whether or not an address of an authorized sender in the received CPM message should be rejected based on the access policy. For the purpose of this, the CPM PF server 810B checks, for example, the following access policy for the received message. The above check may include i) checking a feature tag, ii) checking a pager mode message, iii) checking a condition of a sending user (for example, checking an identity of the sender (e.g., phone number, email address, etc.), and iv) checking whether or not it is allowed.

In order to check the feature tag, for example, the CPM PF server 810B checks whether or not the <conditions> element is set to "true" for the CPM service by evaluating the <service-list> element and the <service> element in which a value "feature tag" is set.

In order to check the pager mode message, for example, the CPM PF server 810B checks whether or not a <media-list> under the <conditions> element is set to "true" for the CPM media pager-mode message. In order to check the condition of a sending user, for example, the CPM PF server 810B checks whether or not it is set to "true" within the <conditions> element for the sender of the CPM message. For example, the CPM PF server 810B checks whether or not there is an identity of the sender (e.g., phone number, email address, etc.)

In order to check whether or not it is allowed, the CPM PF server 810B checks whether or not it is set to "true" for the CPM media pager mode message having a value "true" within the <allow-reject-invite> action element. If the above rules are checked as true, then the received CPM message is rejected. If the above rules i), ii), and iii) exist, checking whether or not it is allowed will be performed. If the rules i), ii), and iii) do not exist, it will be advanced to the following process (b) or (c).

(b) Next, when the CPM message is an anonymous message, the CPM PF server 810B checks an element related to the anonymous message based on the user preference (or settings) or service provider policy. If the anonymous message not supported, then the received message is not delivered to the user, but an error message will be transmitted to the sender.

(c) Next, the CPM PF server 810B checks whether a size of the message is satisfied or a content of the message is satisfied based on the service provider policy. If not satisfied, the received message will be rejected.

(d) When an Expire header is included in the received message, the CPM PF server 810B determines whether or not it is expired based on the header value. When the received message is expired, the received message will be rejected.

(e) The CPM PF server 810B can determine a user preference related to the size of the received message. Specifically, a value of the max-size attribute in the "Large-Message" element in the <Media-List> of the user preference will be checked.

The order of the above-described processes (a), (b), (c), (d), and (e) may be changed with one another.

If it is determined that the message is not rejected but received by a CPM PF server during the processes (a), (b), (c), (d), and (e), then a process for checking whether there are receivable terminals will be performed. The CPM PF server 810B will check the user preference for message delivery to search registered (i.e., accessed) terminals of the user B. Then, the CPM PF server 810B will consider and check the user preference for each of the searched terminals (i.e., per-device user preference), device capability, device connectivity, service provider policy, and the like, thereby checking if there exist any terminal that can receive a message.

On the other hand, if there exist no receivable terminal (for example, in case where the user is roaming) (or in case where the user is not registered or the user's status is set to "not available"), a general user preference (specifically, "preference when the user is not available") is checked to determine whether to defer the message, interwork with the interworking server to deliver the message, redirect the message to other terminal or store the message (S132).

If it is determined to be interworked, then CPM PF server 810B delivers the CPM message to an interworking selection function unit of the interworking server 700B, and the interworking selection function unit determines into which type of message the CPM message will be changed. At this time, service provider's policy, user preference of the terminal B1 100B, or characteristics of the CPM message will be considered when determining the above. The interworking selection function unit requests a conversion into the determined type to the interworking function unit, and the interworking function unit converts the CPM message into the determined type.

Otherwise, if it is determined to be deferred, then the CPM PF server 810B does not deliver the CPM message, but temporarily stores it in a deferred message queue, for instance.

At this time, the following information will be stored together therewith. The information existing in a header of the message will be stored, such as From, To, P-Asserted-Identity, Subject, Date, Accept-Contact, All CPIM headers relevant for IMDN, Content-Type, Content-Length, CPM-Conversation-ID, CPM-Contribution-ID, CPM-ReplyTo-Contribution-ID.

Furthermore, the CPM PF server 810B may assign identification information, for instance, ID (i.e., Message-URI-ID) to the temporarily stored message, and transmits a notification message including the identification message (S133). The notification message may be a SIP-based MESSAGE, notification via Push enabler or SIP-based NOTIFY message. In addition, the notification message may be converted to a suitable format (e.g., SMS) when transmitted to a client that is not a CPM client.

On the other hand, the order of the processes S131 and S132 may be changed with each other. For example, when receiving the CPM message, the CPM PF server 810B checks the general user preference to determine whether the received CPM message will be deferred, interworked, stored, or delivered. Then, if it is determined to be delivered, then the CPM PF server 810B checks the user preference for message delivery to search terminals registered (i.e., accessed) to the user B, and then checks the user preference for each of the searched terminals (i.e., per-device user preference), thereby checking if there exist any terminal that can receive a message.

4) Next, procedures (S140) of transmitting a response message to the terminal A1 100A will be performed. Specifically, the CPM PF server 810B transmits a response message for example a 200 OK message based SIP to the CPM PF server 810A through the SIP/IP networks 500B, 500A. The response message is transmitted to the CPM PF server 810A. When receiving the response message, the CPM PF server 810A delivers the response message to the terminal A1 100A of the user A.

The procedures (S140) of transmitting a response message to the terminal A1 100A may be omitted. Otherwise, they may be performed subsequent to the procedures (S150) of processing the deferred message.

5) Next, the procedures (S150) of processing the deferred message will be performed.

Specifically, the CPM PF server 810B operates a timer for the deferred message based on the service provider's policy and setting information stored in the message. If the timer is expired or ineffective (S151), then the CPM PF server 810B checks the user preference (S152).

Then, based on the checked result of the user preference, it determines whether the deferred message in the CPM PF server 810B is deleted or stored into the message storage server 600 (S153).

In case where the deferred message should be stored, the CPM PF server 810B transmits the CPM message to the message storage server 600 (S154). At this time, the CPM PF server 810B delivers the CPM message to the message storage server 600 using an IMAP command.

The message storage server 600 stores the CPM message (S155), and transmits a response message including the information on the CPM message stored within the message storage server 600 (an identifier allowing to discern the message among a plurality of messages that has been stored within the message storage server 600, for example, unique identifier (UID)) (S156). The message storage server 600 can generate the identifier or UID based on the RFC3501.

Then, the CPM PF server 810B extracts the information on the message within the response message, and generates a notification message including at least one of the identification information (i.e., Message_URI-ID) on the deferred message stored in the CPM PF server and the UID (S157).

The notification message is used to notify that the message has been stored in the message storage server 600 subsequent to the expiry of the timer.

The notification message may be generated as a SIP-based MESSAGE, notification via Push enabler or SIP-based NOTIFY message. The information may be included in a main body of the notification message or may be included in a header thereof. At this time, the CPM PF server 810B may insert information for notifying that the notification message is a system message into a header of the message. Then, Request_URI is set at a CPM address of the intended recipient within the message. Then, identifier information of the CPM PF server is inserted into a CPM address of the sender.

Then, the CPM PF server 810B transmits the generated message to the terminal B1 100B (S157). Alternatively, the message storage server 600 may directly transmit a notification message including the information on the stored message to the terminal B1 100B.

Then, the CPM PF server 810B deletes the message that has been temporarily stored (S158). The deletion process (S158) may be implemented prior to the transmission of the notification message (S157). Otherwise, it may be performed prior to the process S157.

6) Next, the procedures (S160) of acquiring the message by the terminal B1 100B will be performed.

When receiving the notification message (S133, S157), the terminal B1 100B extracts the information on the message included within the notification message, and stores the information. The terminal B1 100B selectively notifies the user about the reception of the notification message.

Based on a request from the user, or request of an application within the terminal B1 100B, the terminal B1 100B checks a current status of the deferred CPM message if the CPM message is required. In other words, the terminal B1 100B checks where the CPM message is stored by using one or more received notification messages (S133, S157) (S161).

When it is confirmed that the CPM message has been stored in the CPM PF server by a notification message received during the process S133, a request for the message including the information (i.e., Message-URI-ID) generated in the CPM PF server will be transmitted to the CPM PF server. The message request message may be a SIP-based INVITE message. Furthermore, the request message may include an additional processing request (for instance, deliver, interworking, store) for the deferred CPM message.

On the contrary, when it is confirmed that the CPM message has been stored in the message storage server 600 by a notification message received during the process S157, a request for the message including the information (i.e., UID) on the message generated in the message storage server will be transmitted to the message storage server. The message request message may be an IMAP-based FETCH command.

When receiving the request message, the message storage server 600 retrieves the requested CPM message from the stored messages based on the information included in the request message. Then, the requested CPM message will be transmitted to the terminal B1 100B (S163).

As described above, according to a first embodiment of the present invention, the terminal B1 100B is operated to correctly receive a message that has not been transmitted to the terminal B1 100B but deferred. Furthermore, the failure of message transmission can be reduced, thereby effectively providing network resources.

Figure 5:
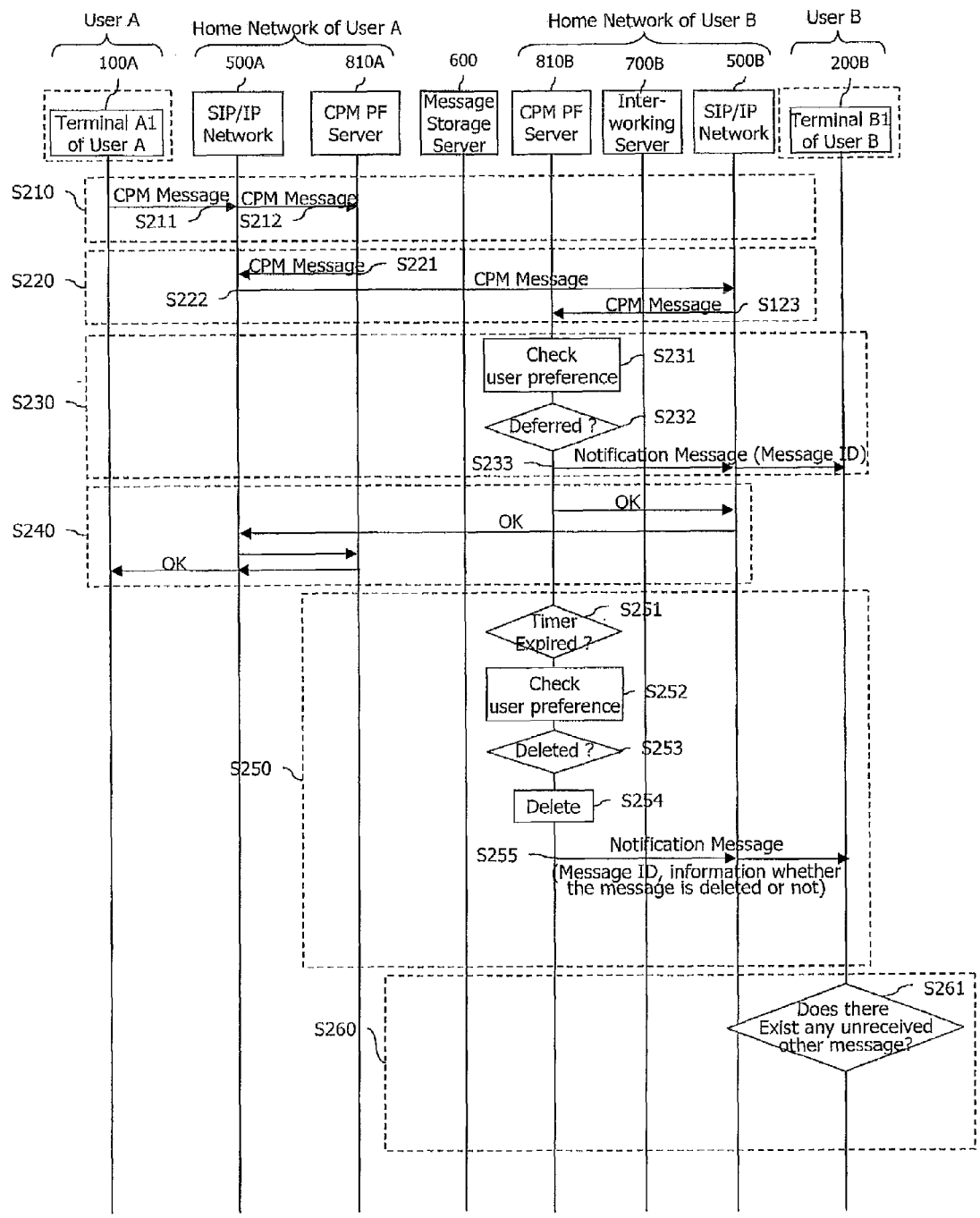
FIG. 5 is a flow chart exemplarily illustrating a second embodiment of the present invention.

FIG. 5 is a flow chart exemplarily illustrating a second embodiment of the present invention.

In FIG. 5, there are illustrated procedures (S210) of transmitting a CPM message by the terminal A1 100A of the user A, procedures (S220) of delivering a CPM message to a CPM PF server within a home network of the user B, a procedure (S230) of checking user preference and processing when there is no receivable terminal, procedures (S240) of transmitting a response message to the terminal A1 100A, procedures (S250) of processing a deferred message, and procedures (S260) of acquiring the message by the terminal B1 100B.

The procedures S210, S220, S230, and S240 are similar to the procedures S110, S120, S130, and S140 respectively, and therefore, the content of FIG. 4 will be used for the description of similar procedures, and procedures S250 and S260, which are different from the procedures of FIG. 4, will be only described.

First, the procedures (S250) of processing a deferred message will be described below.

The CPM PF server 810B drives a timer for the deferred message based on the service provider's policy and setting information. If the timer is expired (S251), then the CPM PF server 810B checks the user preference (S252).

Then, based on the checked result of the user preference, it determines whether the deferred message should be deleted or stored in the message storage server 600 (S253).

When the deferred message should be deleted, the CPM PF server 810B deletes the message from the deferred message queue. Then, the CPM PF server 810B generates a notification message to notify that the expired CPM message has been deleted. The notification message may be a SIP-based MESSAGE, notification via Push enabler, a SIP-based notification message, or a SIP-based NOTIFY message. The notification message may include information (identification information, i.e., Message-URI-ID) on the deferred CPM message and a current status (i.e., deleted) of the deferred CPM message.

Then, the CPM PF server 810B inserts information for notifying that the generated notification message is a system message into a header of the SIP-based message. Then, Request_URI is set at a CPM address of the intended recipient. Then, identifier information of the CPM PF server is inserted into a CPM address of the sender to transmit it to the terminal B1 100B (S255).

Next, the procedures (S260) of acquiring the message by the terminal B1 100B will be described below.

When receiving the notification message, the terminal B1 100B extracts information on the deferred CPM message included within the notification message. Then, the terminal B1 100B recognizes that the deferred CPM message has been deleted, from the information on the current status.

As described above, according to a second embodiment of the present invention, whether a message that has not been received by the terminal B1 100B but deferred is deleted within the CPM PF server 510B is notified to the terminal B1 100B, thereby allowing the terminal B1 100B not to request the deleted message. As a result, it has an advantage of reducing an error, and preventing network resources from being wasted due to an erroneous request.

Figure 6:
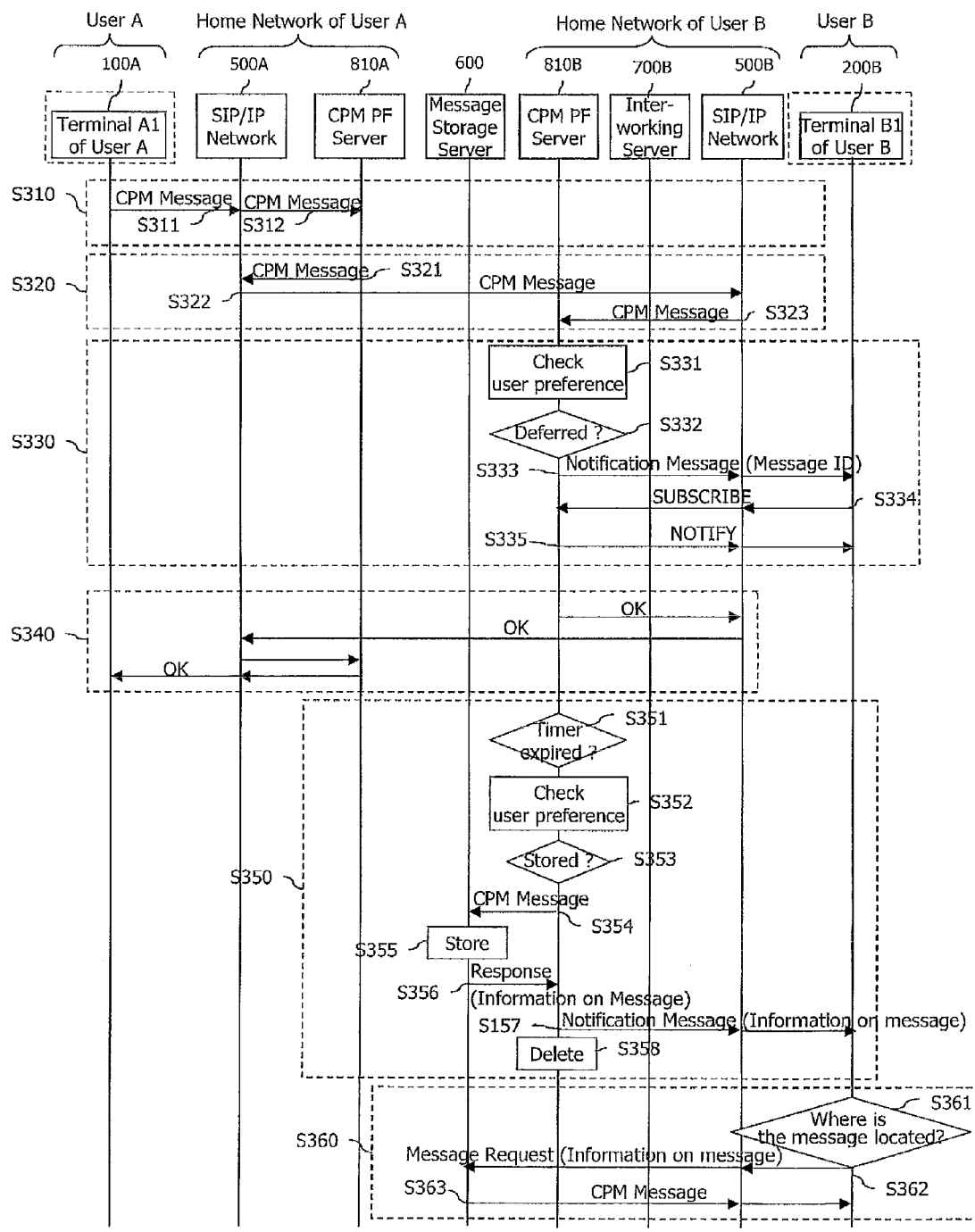
FIG. 6 is a flow chart exemplarily illustrating a third embodiment of the present invention.

FIG. 6 is a flow chart exemplarily illustrating a third embodiment of the present invention.

The procedures S310, S330, S340, S350, and S360 are similar to the procedures S110, S130, S140, S150, and S160 respectively, and therefore, the content of FIG. 4 will be used for the description of similar procedures, and a procedure S320, which is different from the procedures of FIG. 4, will be only described.

When receiving the CPM message, the CPM PF server 810B within a home network of the user B checks the user preference (or settings) of the user B (S331). The content of the process S131 in FIG. 4 will be used for the detailed description thereof.

If it is determined to be deferred as described above, then the CPM PF server 810B does not deliver the CPM message, but temporarily stores it in a deferred message queue, for instance.

Furthermore, the CPM PF server 810B may assign identification information, for instance, ID, to the temporarily stored message, and transmits a notification message including the identification information (i.e., Message-URI-ID) on the temporarily stored message generated by the CPM PF server 810B (S333). The notification message may be a SIP-based MESSAGE, notification via Push enabler or SIP-based NOTIFY message.

The terminal B1 100B transmits a registration request message, for instance, a SUBSCRIBE message, to the CPM PF server 510B in order to know the status of the deferred message in case of making a registration in a CPM network or when the user wants to check if there is any deferred message (S334).

In case where the terminal B1 100B wants to receive the deferred message after receiving a notification for the deferred message through a non-CPM client, it can make a registration in a CPM network and then transmit a SUBSCRIBE message to obtain information on the deferred message.

In response to the registration request message, the CPM PF server 510B transmits a SIP-based NOTIFY message (S335). The NOTIFY message may include information (i.e., meta data) on the deferred message.

Figure 7:
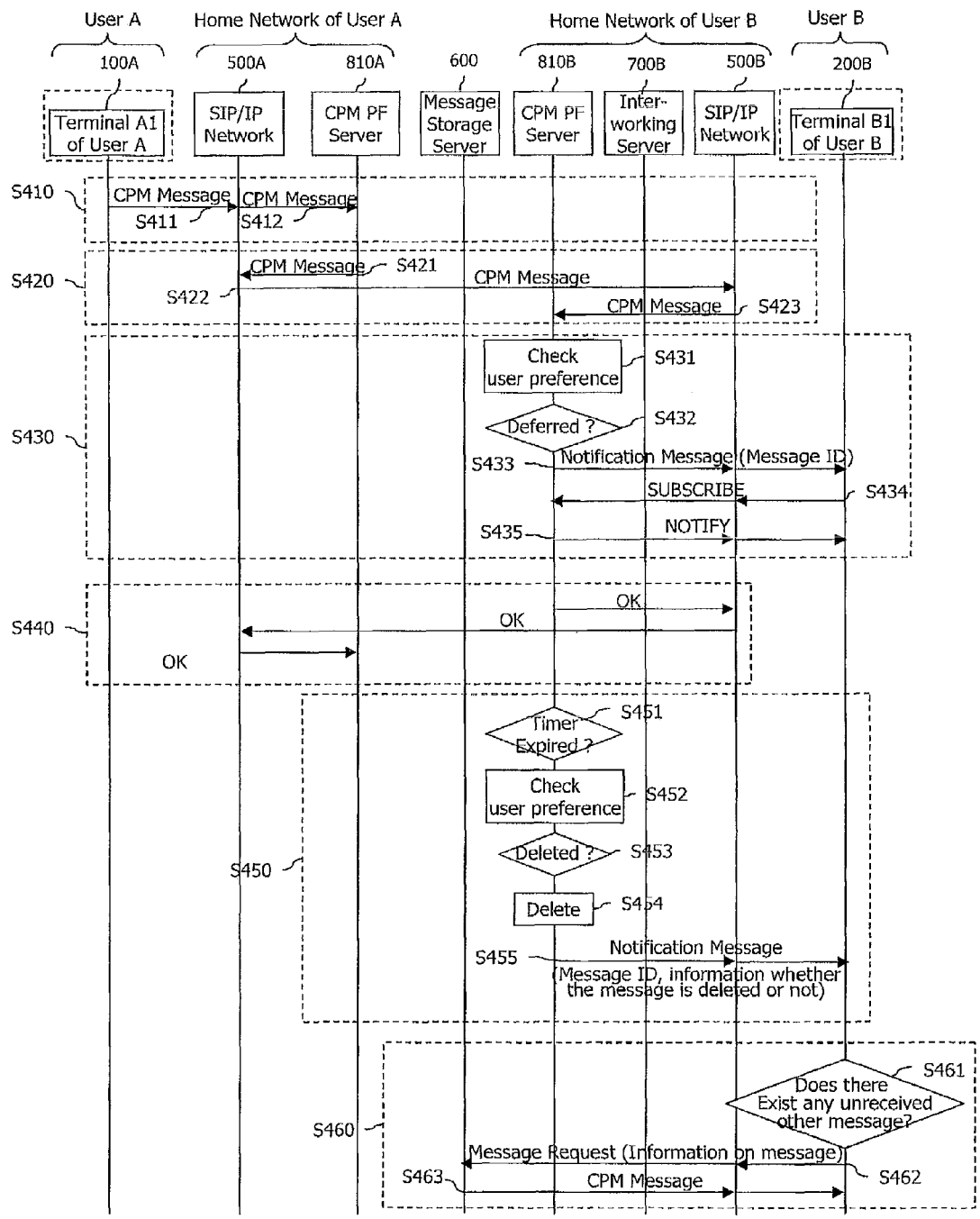
FIG. 7 is a flow chart exemplarily illustrating a fourth embodiment of the present invention.

FIG. 7 is a flow chart exemplarily illustrating a fourth embodiment of the present invention.

The fourth embodiment as illustrated in FIG. 7 may be implemented by combining some processes of FIG. 4, some processes of FIG. 5, and-sol processes of FIG. 6.

In other words, the procedures S410, S420, and S440 as illustrated in FIG. 7 are similar to the procedures S110, S120, S140, and S160 of FIG. 4. Furthermore, the processes S450 and S460 are similar to the processes S250 and S260 of FIG. 5. In addition, the process S430 is similar to the process S330 of FIG. 6.

As described above, the fourth embodiment as illustrated in FIG. 7 can be easily understood by those skilled in the art from the description of FIGS. 4 through 6, and thus it will not be described in detail and follow the above description.

Figure 8:
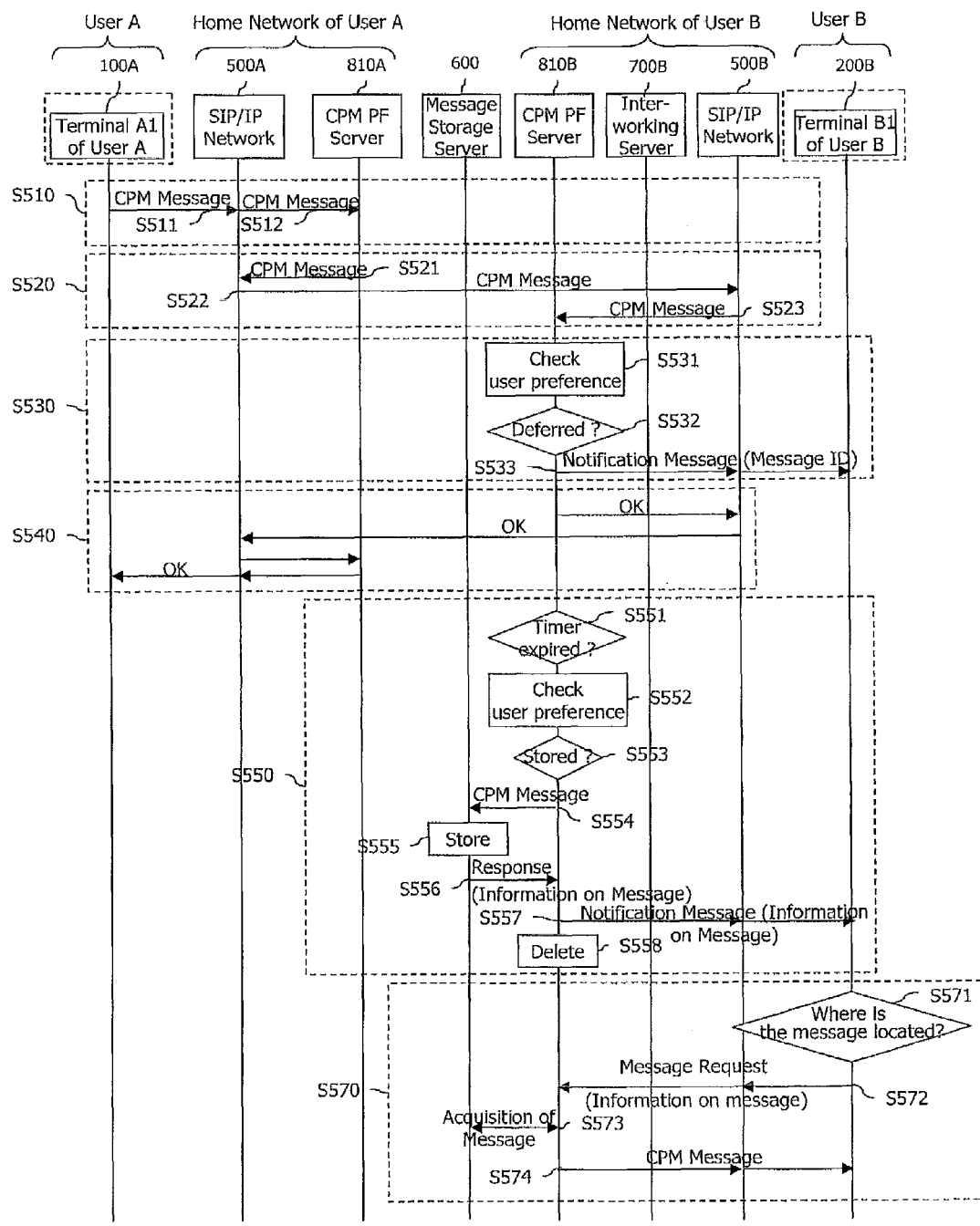
FIG. 8 is a flow chart exemplarily illustrating a fifth embodiment of the present invention.

FIG. 8 is a modified example of the first and the third embodiments.

Referring to FIG. 8, when the deferred CPM message is stored within the message storage server, differently from the first and the third embodiments, the terminal B1 100B transmits a request being sent to the CPM PF server 510B by inserting a file identifier used in the storage server in order to obtain the deferred CPM message stored in the storage server (S162).

When receiving the message request, the CPM PF server 510B can acquire the requested message from the message storage server 600 using a file identifier included in the requested message (S573) and provide it to the terminal B1 100B (S574).

Such a modified example can be easily understood by those skilled in the art on the basis of the foregoing description, and thus it will not be described in detail.

Figure 9:
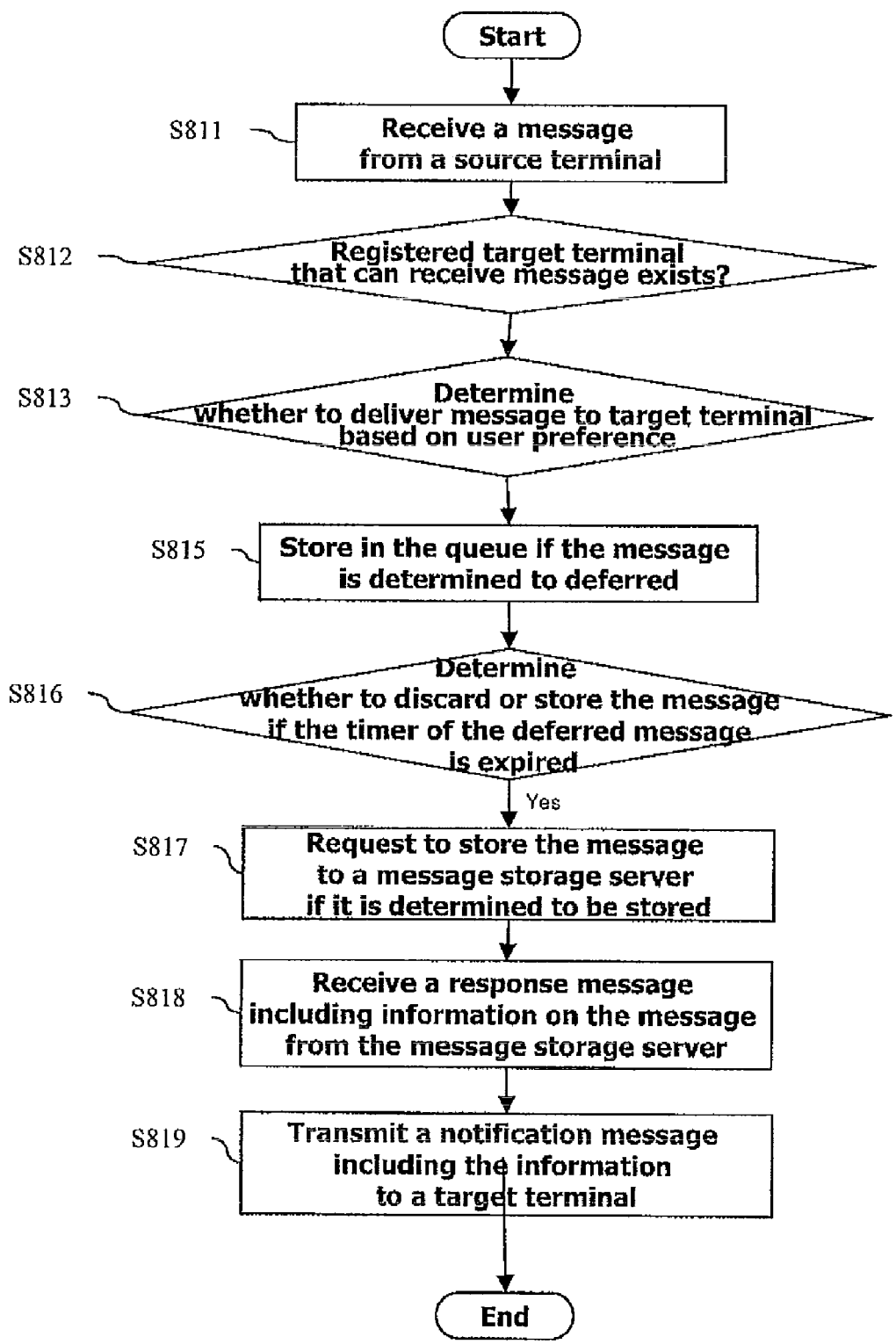
FIG. 9 is a flow chart illustrating the operation of a CPM PF server.

FIG. 9 is a flow chart illustrating the operation of a CPM PF server.

Referring to FIG. 9, when the CPM PF server 810 receives a message from a source terminal (S811), the CPM PF server 810 checks whether there are registered target terminals that can receive a message from the source terminal based on a user preference (user settings) (S812).

And, the CPM PF server 810 determines whether to reject, deliver, defer or store the message from the source terminal based on the user preference (S813).

If it is determined to defer the transmission of the CPM message, then the CPM PF server 810 stores the CPM message in a queue (S815).

On the other hand, when the timer for the CPM message is expired, the CPM PF server 810 determines whether the CPM message is discarded or stored based on the user preference (S816).

If it is determined to be stored, then the CPM PF server 810 requests the storage of the message to the message storage server (S817), and receives a response message including the information on the stored message from the message storage server (S818). Subsequently, the CPM PF server 810 inserts the information into the message to transmit it to the target terminal (S819).

On the other hand, the operation of the CPM PF server has been briefly described, but it should be construed that the CPM PF server can perform the operation as illustrated in FIGS. 4 through 8.

As described up to this point, a method according to the present invention can be realized by software, hardware, or their combination. For example, a method according to the present invention may be stored in a storage medium (e.g., internal terminal, flash memory, hard disk, etc.), and may be realized by codes or commands within a software program that is executable by a processor, such as microprocessor, controller, microcontroller, application specific integrated circuit (ASIC). It will be described with reference to FIG. 10.

Figure 10:
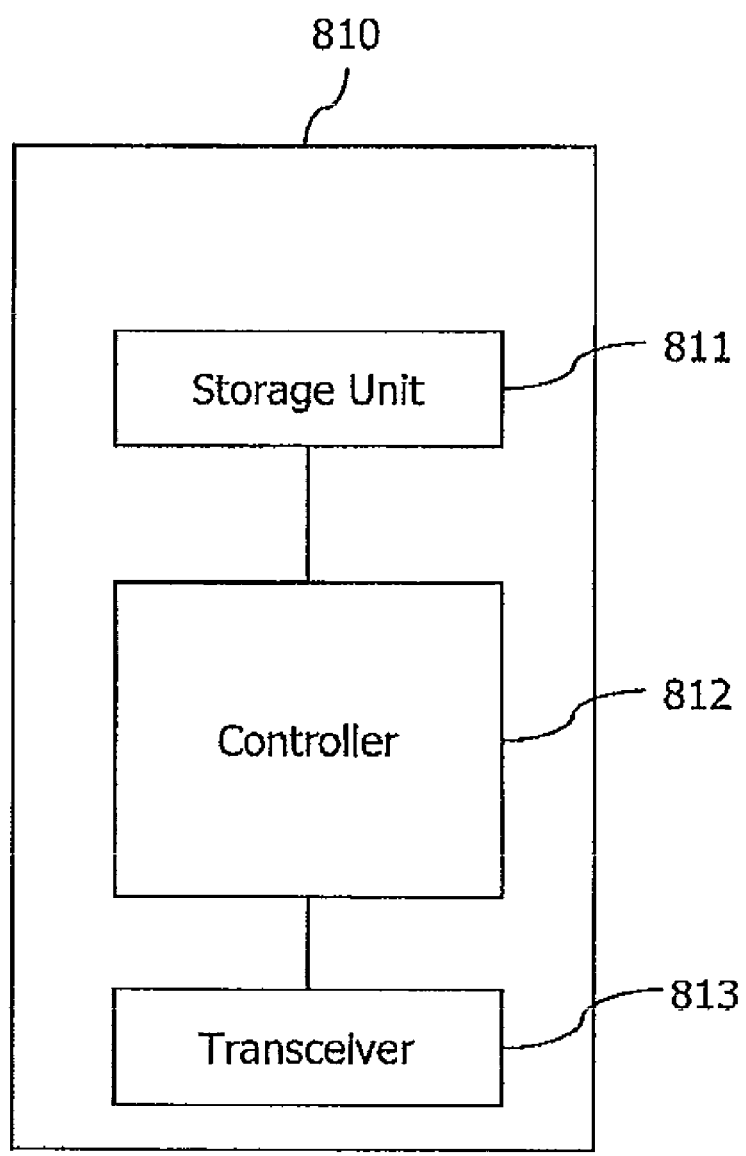
FIG. 10 is a configuration block diagram illustrating a CPM PF server according to the present invention.

FIG. 10 is a configuration block diagram illustrating a CPM PF server according to the present invention.

As illustrated in FIG. 10, the CPM PF server 810 may include a storage means 811, a controller 812, and a transceiver 813.

The storage means 811 stores a software program in which a method illustrated in FIGS. 4 through 9 is realized.

The controller 812 controls the storage means 811 and the transceiver 813 respectively. Specifically, the controller 812 implements each of the foregoing methods stored in the storage means respectively. Then, the controller 812 transmits the foregoing signals through the transceivers.

Though preferred embodiments of present invention are exemplarily described as disclosed above, the scope of the invention is not limited to those specific embodiments, and thus various modifications, variations, and improvements can be made to the present invention without departing from the spirit of the invention, and within the scope of the appended claims.

The invention claimed is:

1. A method for delivering a message in a converged IP messaging (CPM) server, the method comprising:
    determining whether a CPM message is not allowed if the CPM message is received;
    checking information related to a user preference of a recipient or to a policy if it is determined that the CPM message is allowed;
    determining whether there are at least one or more terminals of the recipient capable of receiving the CPM message, among terminals of the recipient, according to a result from checking the information;
    storing the CPM message in a queue for defer when it is determined that there is no terminal of the recipient capable of receiving the CPM message;
    determining whether to discard or store the CPM message based on the information if a time value for the CPM message in the queue for defer is expired;
    requesting to store the CPM message to a message storage server when it is determined to be stored;
    receiving a response message including information related to the stored message from the message storage server; and
    transmitting a message including the information on the stored message,
    wherein the information related to the user preference or to the policy comprises:
    first information indicating whether to reject, defer, or store the CPM message or whether to perform interworking;
    second information on a way how to handle a situation where there exists a terminal of the recipient in a registered or receivable state, and
    third information on a way how to handle a situation where there is no terminal of the recipient in the registered or receivable state.

2. The method of claim 1, wherein the information on the message comprises identification information on the message within the CPM server.

3. The method of claim 1, wherein the information on the message allows to identify the CPM message within the message storage server.

4. The method of claim 1, wherein the information on the message is a unique identifier (UID) for the CPM message.

5. The method of claim 1, wherein the notification message further comprises information on the message storage server.

6. The method of claim 1, wherein the notification message is a SIP-based message when the terminal of the recipient supports a CPM, and is a non-SIP-based message when the terminal of the recipient supports a non-CPM.

7. The method of claim 1, wherein the CPM server is located within a home network of the terminal of the recipient.

8. The method of claim 1, further comprising:
    transmitting by the CPM server the information on the deferred message to the terminal of the recipient.

9. The method of claim 1, wherein the user preference comprises,
    a first user preference for determining the processing of the message; and
    a second user preference related to the storing of the message.

10. A converged IP messaging (CPM) server, comprising:
    a processor for determining whether a CPM message is not allowed if the CPM message is received, checking information related to a user preference of a recipient or a policy if it is determined that the CPM message is allowed, determining whether there are at least one or more terminals of the recipient capable of receiving the CPM message, among terminals of the recipient, according to a result from checking the information, storing the CPM message in a queue for defer if it is determined that there is no terminal of the recipient capable of receiving the CPM message, and determining whether to discard or store the CPM message based on the information if a time value for the CPM message in the queue for defer is expired, and
    a transceiver for requesting to store the message to a message storage server if it is determined to be stored by the processor, receiving a response message including information related to the stored message from the message storage server and transmitting a message including the information on the stored message to the target terminal, wherein the information related to the user preference or to the policy comprises:

first information indicating whether to refect, defer, or store the CPM message or whether to perform interworking second information on a way how to handle a situation where there exists a terminal of the recipient in a registered or receivable state, and third information on a way how to handle a situation where there is no terminal of the recipient in the registered or receivable state.

11. The CPM server of claim 10, wherein the information on the CPM message comprises identification information on the CPM message.

12. The CPM server of claim 10, wherein the information on the CPM message allows to identify the CPM message within the message storage server.

13. The CPM server of claim 10, wherein the information on the message is a unique identifier (UID) for the CPM message.

* * * * *